3,694,356
ABATEMENT OF WATER POLLUTION
Johannes M. A. Vander Horst, Olean, N.Y., assignor to the United States of America
No Drawing. Filed Mar. 17, 1971, Ser. No. 95,899
Int. Cl. C02b 1/20
U.S. Cl. 210—47                                    4 Claims

ABSTRACT OF THE DISCLOSURE

A process for the purification of effluent from sewage treatment combined with the simultaneous purification of acidic mine drainage by combining the two streams in suitable proportions so as to precipitate water insoluble iron phosphates.

BACKGROUND OF THE INVENTION

In recent years it has become overwhelmingly evident that phosphates contained in human waste and in detergents constitute a major threat against the continued existence of all open bodies of fresh water. The phosphate content of such waters is progressively reaching, and in some cases has already reached, the point where rapid growth of algae occurs, resulting in eutrophication. Once started the process of eutrophication is difficult to arrest and still more difficult to reverse. The result is the elimination of such water bodies as sources of drinking water, as environments for fish and as areas for recreation. Primary and secondary sewage treatments for cities do not eliminate these phosphates.

Acid mine drainage is a pollution source of longer standing. It results from a concatenation of circumstances. Typically, in abandoned mines, sulfides in the environmental minerals are oxidized due to the exposure to air; water seepage dissolves the sulfur oxides so formed and transforms them into acids; these acids in turn leach heavy metals out of the environmental minerals. The result is drainage into creeks and rivers of acid water solution containing heavy metal ions, which are considered serious water pollutants. While the acidity can be removed by neutralization, e.g. by limestone, this does not remove the heavy metal ions.

BRIEF SUMMARY OF THE INVENTION

The present invention relates to a method for reduction and elimination of pollution, and more particularly pollution by phosphates and by acid mine drainage concurrently.

It is an object of this invention to reduce water pollution caused by mine drainage as aforesaid.

It is a further object of this invention to reduce phosphate water pollution.

This invention is based on the fact that most heavy metal phosphates are water insoluble or have such a low solubility therein as to make them insoluble for all practical purposes.

This invention is directed to the concept of treating a stream of acid mine drainage in suitable proportions with a stream of secondary sewage effluent, whereby the heavy metals are precipitated as phosphates, the acidity is reduced and the phosphate content is reduced. The pH of secondary sewage effluent is generally 7.5 or higher. Further reduction of acidity can be achieved by conventional means, e.g. the addition of limestone.

The process of this invention may in some cases be beneficially employed in conjunction with other treatment processes. So, for instance, the process of the invention may be used in conjunction with biological treatments of sewage, as otherwise described in U.S. Pat. 3,480,144, by introducing acid mine drainage into the aeration zone of a typical sewage plant in an appropriate ratio, if necessary preceded by neutralization, in part or entirely, of the acid mine drainage with lime, as described in U.S. Pat. 3,423,309.

Alternatively, the process of the invention may be used in conjunction with flocculating aids such as acrylamide-acrylic copolymers described in U.S. Pat. 3,506,570, or a synthetic cationic organic latex described in U.S. Pat. 3,453,207. Or the ferrous ion in the acid mine drainage may itself serve as a flocculant in sewage treatment processes through subsequent addition of an alkalizing agent as described in U.S. Pat. 3,488,717.

DETAILED DESCRIPTION OF THE INVENTION

Phosphate is removed from sewage according to this invention by contacting the sewage with acid mine drainage, which contains dissolved iron salts. This treatment is capable of removing substantial amounts of phosphate present in the sewage while simultaneously removing substantial amounts of iron ion from the acid mine drainage. The ferrous ion in the acid mine drainage combines readily with the phosphate ion in the sewage to form water insoluble iron phosphate. The ratio of acid mine drainage to sewage is controlled so as to create optimum conditions for precipitation of both phosphates and iron. The liquid containing water insoluble iron phosphate can then be submitted to flocking treatment, if desired with the aid of coagulants, so as to promote precipitation.

Example I

Two solutions were prepared, solution X representative of acid mine drainage containing:

|  | P.p.m. |
|---|---|
| $Fe^{++}$ | 525 |
| $Ca^{++}$ | 384 |
| $SO^{--}$ | 1940 |
| pH 2.15 | | and solution Y representative of secondary sewage plant effluent containing:

|  | P.p.m. |
|---|---|
| $PO_4^{---}$ | 28 |
| $NH_4^+$ | 42 |
| $Na^+$ | 60 |
| pH 7.5 | |

These solutions were mixed and the $PO_4^{---}$ content determined according to ASTM D515 Non-Referee Method B immediately after mixing and filtration through a Whatman No. 50 filter. The results are presented in Table I.

TABLE I

| | Ratio | pH | PO₄ removal, percent |
|---|---|---|---|
| Test number: | | | |
| A1 | 1:10 | 3.35 | 40 |
| B1 | 1:15 | 3.75 | 45 |
| C1 | 1:17 | 3.80 | 46 |
| D1 | 1:18 | 3.85 | 48 |
| E1 | 1:20 | 4.00 | 43 |
| F1 | 1:25 | 4.55 | 43 |
| G1 | 1:30 | 5.65 | 43 |

Example II

With the same mixtures as those employed in Example I, the $PO_4^{---}$ content was determined by the same method 24 hours after mixing and after filtration through a Whatman No. 50 filter. The results were presented in Table II.

TABLE II

| Test number: | pH | PO4 removal, percent |
|---|---|---|
| A2 | 3.35 | 44 |
| B2 | 3.75 | 44 |
| C2 | 3.80 | 47 |
| D2 | 3.85 | 44 |
| E2 | 4.00 | 49 |
| F2 | 4.55 | 57 |
| F3 | 6.45 | [1] 61 |
| G2 | 5.65 | 56 |
| G3 | 6.45 | [1] 59 |

[1] For tests F3 and G3 the pH was adjusted with NaOH.

Example III

Mixtures F and G of Example I were analyzed according to ASTM D515 for $PO_4^{---}$ content and according to ASTM D1068 Non-Referee Method C for Fe content at various waiting times after mixing and after filtering through a Whatman No. 42 filter. The results are presented in Table III.

TABLE III

| | | Percent | | |
|---|---|---|---|---|
| | pH | PO4 removal | Fe removal | Time elapsed |
| Test number: | | | | |
| F4 | 4.7 | 65 | 77 | 2 minutes. |
| F5 | 4.9 | 63 | 74 | 24 hours. |
| F6 | 4.9 | 66 | 78 | 48 hours. |
| F7 | 5.6 | 72 | 84 | 72 hours. |
| G4 | 5.6 | 52 | 73 | 2 minutes. |
| G5 | 5.3 | 65 | 92 | 24 hours. |
| G6 | 5.4 | 70 | >98 | 48 hours. |
| G7 | 5.7 | 78 | >98 | 72 hours. |

Example IV

Mixture G of Example I was analyzed for $PO_4^{---}$ and Fe contents by the same methods as under Example III. The results are presented in Table IV.

TABLE IV

| | | Percent | | |
|---|---|---|---|---|
| | pH | PO4 removal | Fe removal | Time elapsed |
| Test number: | | | | |
| G8 | 6.9 | 50 | 76 | 2 minutes. |
| G9 | 6.8 | 60 | 98 | 24 hours. |
| G10 | 6.8 | 62 | >98 | 48 hours. |

As has been shown in the examples, according to the process of this invention:

(1) Iron and phosphate ion are coprecipitated in substantial amounts.

(2) Coprecipitation is favored by the higher pH values.

(3) The precipitate is very fine, and flocculation promoters or the secondary sewage treatment process itself will be useful in helping the precipitate to settle out.

(4) The precipitate agglomerates to large particles with the passage of time.

I claim:

1. The method of reducing water pollution, which comprises the steps of mixing sewage containing phosphates in excess of background levels with acidic mine drainage effluent containing dissolved iron, controlling the ratio of such admixture whereby to precipitate insoluble iron phosphates which are nonpollutant to the environment, and adding an alkalizing agent to the mixture in order to achieve a pH in excess of 4.0.

2. The process of claim 1 wherein mixing and precipitation is accomplished in conjunction with secondary sewage treatment.

3. The process of claim 1 wherein mixing and precipitation is accomplished in conjunction with a flocculating treatment.

4. The process of claim 1 wherein the mixture is passed through a settling pond to promote complete precipitation.

References Cited

UNITED STATES PATENTS

| 3,423,309 | 1/1969 | Albertson | 210—53 X |
| 3,579,443 | 5/1971 | Horst | 210—49 |
| 3,347,787 | 10/1967 | Rhodes | 210—50 |
| 3,468,797 | 9/1969 | Myers | 210—42 |
| 3,493,340 | 2/1970 | Bosen et al. | 210—42 X |
| 3,488,717 | 1/1970 | Wukasch et al. | 210—53 |

REUBEN FRIEDMAN, Primary Examiner

T. G. WYSE, Assistant Examiner

U.S. Cl. X.R.

210—51